April 21, 1931.   L. G. BRAZIER   1,801,900
LAYING OF ELECTRIC CABLES AND APPARATUS THEREFOR
Filed Oct. 22, 1928
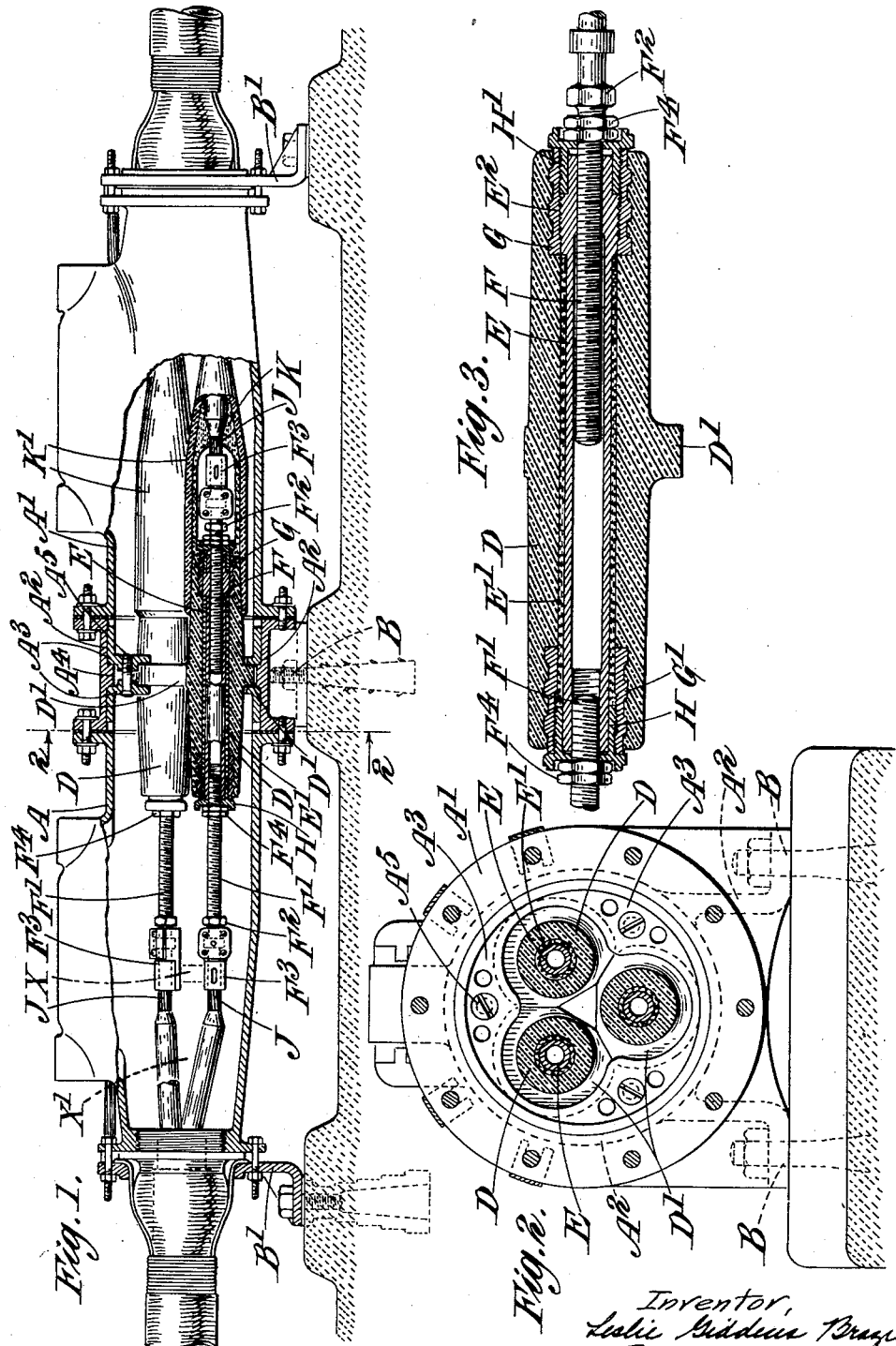

Patented Apr. 21, 1931

1,801,900

UNITED STATES PATENT OFFICE

LESLIE GIDDENS BRAZIER, OF LONDON, ENGLAND

LAYING OF ELECTRIC CABLES AND APPARATUS THEREFOR

Application filed October 22, 1928, Serial No. 314,261, and in Great Britain November 3, 1927.

This invention relates to the laying of electric cables and apparatus therefor.

It is now recognized that it is of great importance that an electric cable, particularly a high or extra high tension insulated electric power cable, should have provision made for the effects, on the components of the cable, of the temperature variations due to current load or otherwise; and that particularly, the conductor should be protected from the necessity of continuous movement to accommodate changes introduced by temperature expansion. This movement is sometimes referred to as "creeping."

The present invention relates more particularly to a method of and apparatus for laying cables whereby such movement is prevented or minimized.

According to this invention, when the cable is laid the conducting core of each length is subjected to a permanent constant stretch which, whilst below that which would strain the copper beyond its elastic limit, is sufficient to insure that the core remains in tension when subjected to the maximum rise of temperature likely to occur in working. For example, rise of temperature due, say, to continuous working at full load.

This is accomplished by the use of what may be termed stressing or stretching joints by means of which each core length can be extended and the ends of the core length then anchored.

These stretching joints may be of very simple construction and comprise some adjustable device to which the end of the core is attached and by means of which it can be extended and/or kept stretched.

Thus in carrying out this invention the conducting core of the cable is stretched and its ends anchored to rigid supports so that the conductor remains in tension when subjected to the above mentioned maximum rise of temperature.

In laying the cable each core length is stretched by means of the stretching joint, but owing to frictional forces, this stretch may not be uniformly distributed over the length of the cable unless the cable is heated sufficiently to reduce the viscosity of the cable compound. This heating may conveniently be carried out by passing a low tension current through the cable. While it is being heated the stretching joints are screwed up to keep the cores taut, and are finally locked in position when the required stretch has been obtained.

It will be appreciated that in carrying out this invention the conductor is at no time placed under a compressive force, so that it is entirely relieved of any tendency to be "birdcaged," this term being descriptive of the effect which compressive forces tending to shorten the length of a stranded conductor produce by spreading or separating the individual wires to distort the form of the conductor. Further the wormed conductors of multicore cables are relieved from any tendency to be "birdcaged" away from each other.

The problem involved in this improved method of laying an insulated electric power cable is very different from that concerned with merely keeping a light conductor taut by spring or like tensioning devices.

In carrying out the invention the following considerations are involved,

If the core of a cable is subjected simultaneously to a tensile stress and to a rise of temperature, it will be stretched an amount given by:—

$$e = \frac{pl}{kE} + atl \quad (1)$$

where:—

$e$ = stretch in inches.
$p$ = tensile stress in pounds per square inch.
$l$ = initial length in inches.
$E$ = Young's modulus of copper in pounds per square inch.
$k$ = a constant due to the difference between the stranded conductor and a solid copper bar. Generally $k$ is about .7.
$a$ = coefficient of thermal expansion of copper.
$= \frac{16.7}{10^6}$ per degree centigrade.

$t$ = temperature rise in degrees centigrade.
Suppose that the cable is subjected to an elastic stretch without rise of temperature of amount $e_1$ in addition to the stretch due to slack that existed in the cable when the pulling started. If the ends of the cable are now locked in position, the pressure and temperature of the cable will be related by the equation—

$$\frac{pl}{kE} = e_1 - atl \quad (2)$$

or:—

$$p = \frac{kE}{l}(e_1 - atl) \quad (3)$$

It will be seen that $p$ remains tensile so long as:—

$$atl < e_1 \quad (4)$$

or:—

$$t < \frac{e_1}{al} \quad (5)$$

Up to this temperature all parts of the copper will remain in tensile equilibrium with no tendency to be pushed anywhere. The stranded conductors will have no tendency to be birdcaged and also the cores will not be birdcaged away from each other. If it is required to work the cables at a temperature rise $t_1$ the stretch is, therefore, adjusted so that $$e_1 > t_1 al \quad (6)$$

To take an example: Consider a three-core cable 100 yards long with .3 square inch stranded conductors, and $k = .7$. It is required to work with a temperature rise of 20° C. The cable must be subjected to an elastic stretch evenly distributed of amount:

$$e_1 > 20 \frac{16.7}{10^6} 100 \times 36 \quad (7)$$

$$> 1.20 \text{ inches} \quad (8)$$

The cable is, therefore, subjected to an elastic stretch of at least 1.2 inches in addition to any non-elastic stretch due to any slack that may have existed in the cable.

If the cable is not heated a pull of 5970 pounds per square inch will stretch the cable this amount provided this pull is uniformly transmitted over the whole length of the cable without dissipation by frictional forces. As the cable in this example has a cross-sectional area of .9 square inch this corresponds to a pull of 5360 pounds.

In any actual cable frictional forces will exist and so a combination of pull and temperature expansion may be used to obtain the stretch. But so long as an elastic stretch satisfying the inequality (6) (in the case of the example of at least 1.2 inches) is obtained and the ends then locked in position, the method will be fulfilled.

It is to be observed that in pulling the cable the elastic limit of the conductors must not be exceeded. This limit must be determined for the type of stranded conductor being tensioned.

In the accompanying drawings which illustrate one construction of stretching joint according to this invention, Figure 1 is a longitudinal sectional view with parts in elevation and portions broken away, Figure 2 is a transverse section on the line 2—2 of Figure 1 but drawn to a larger scale, and Figure 3 is an enlarged longitudinal section of a portion of Figure 1.

The joint box comprises two main portions A and $A^1$ firmly bolted together at their inner ends to a central member $A^2$ which is itself rigidly held by foundation bolts B. The outer ends of the box are bolted to brackets $B^1$ also rigidly bolted to a concrete or like bed. It is essential that the whole construction shall be very rigid to withstand the heavy forces which are necessarily employed.

Inside the central member $A^2$ are two flanged plates $A^3$ held firmly against an internal step $A^4$ in the central member by studs $A^5$. These plates $A^3$ are shaped to grip shoulders $D^1$ on insulating sleeves D of which in the example there are three as the arrangement is designed for a three-core cable.

Each of these insulators D contains a stretching joint the construction of which can best be seen by reference to Figure 3. Fixed centrally in each insulator is a strong metal tube E screwed internally at one end to take a righthand threaded screw F and at the other end to accommodate a lefthand threaded screw $F^1$. The tube E is wrapped with cambric tape or like insulation at $E^1$ and is slipped into the insulator from the righthand end and an exteriorly screwed portion $E^2$ on the tube is screwed home in a bushing G moulded in the insulator. The lefthand end of the tube E is centered and held by a sleeve H which screws into a bushing $G^1$ moulded in the lefthand end of the insulator D. A similar screwed sleeve $H^1$ is screwed into the bushing G at the righthand end and the tube is thus rigidly fixed in the insulator.

The screws F and $F^1$ have heads $F^2$ by means of which they may be turned, and the conductors J to be joined are sweated into sockets $F^3$, some suitable provision being made so that the socket does not turn when the screw to which it is attached rotates.

The whole arangement is extremely rigid and enables the requisite force to be applied to stretch the conductors. This is done by rotating the screws F and $F^1$ after the conductors have been sweated into their sockets $F^3$, and when the desired amount of stretch has been obtained the screws are locked in position by nuts $F^4$.

In Figures 1 and 3 the righthand screw F is shown as being caused to enter the tube to stretch the conductor to which it is attached, but the lefthand screw $F^1$ is shown as in the position it would occupy after the conductor had been attached to its socket and before the tension had been applied.

As a detail of practice it may be mentioned that before screwing the bolts into their tubes to apply tension to the conductors, some convenient kind of separator or spacer may be placed, say at the point indicated at X in Figure 1, to ensure that the bolts $F^1$ have a straight entry into their tubes. When the tension has been applied that separator is removed and usually another separator is placed between the three insulated cores, as for instance at the point $X^1$ where it is left in position.

As previously mentioned it is convenient to heat the conductors to their full load temperature by passing a low tension current through them to cause them to expand, and to apply the tension by rotating the bolts while they are so heated.

After the tension has been applied insulation, such as cambric tape may be wrapped round the joints as at K (Figure 1) and over that impregnated paper as at $K^1$.

The joint box is intended to be filled with oil or compound and would be fitted with inlets and air domes, but these and other details common to joint boxes are not described as in themselves they do not form part of the present invention.

What I claim as my invention and desire to secure by Letters Patent is:—

1. A method of laying an insulated electric power cable consisting in stretching the conducting core of the cable to give it a definite elongation or extension within its elastic limit and anchoring its ends to rigid supports, the amount of the stretch being such that the conductor remains stretched, i. e. still exerts a tensile force by reason of its own elasticity against the rigidly anchored ends, when subjected to the maximum rise of temperature likely to occur in working.

2. A method of laying an insulated electric power cable as claimed in claim 1 consisting in securing the ends of the conductor in stretching joints, heating the conductor by passing a current through it, and tightening the joints up to leave the conductor stretched.

3. In apparatus for use in laying an insulated electric power cable, the combination with a rigidly supported housing, of stretching means within said housing for transmitting sufficient tension on adjacent cable ends to maintain the cable in stretched condition regardless of expansion of the cable due to changes in temperature, said means including devices for simultaneously gripping each cable end, and a contracting inelastic connection means between each device and the rigidly supported housing.

In testimony whereof I have signed my name to this specification.

LESLIE GIDDENS BRAZIER.